US012795770B2

(12) United States Patent
Lee et al.

(10) Patent No.: US 12,795,770 B2
(45) Date of Patent: Nov. 10, 2026

(54) SYSTEMS AND METHODS FOR UDM/UDR-INITIATED UE CONTEXT MANAGEMENT

(71) Applicant: Verizon Patent and Licensing Inc., Basking Ridge, NJ (US)

(72) Inventors: Jay J. Lee, San Ramon, CA (US); Shanthala Kuravangi-Thammaiah, Keller, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 459 days.

(21) Appl. No.: 18/484,536

(22) Filed: Oct. 11, 2023

(65) Prior Publication Data

US 2025/0126673 A1 Apr. 17, 2025

(51) Int. Cl.

*H04W 76/23* (2018.01)
*H04W 76/11* (2018.01)
*H04W 76/38* (2018.01)

(52) U.S. Cl.

CPC ............ *H04W 76/23* (2018.02); *H04W 76/11* (2018.02); *H04W 76/38* (2018.02)

(58) Field of Classification Search

CPC ...... H04W 76/11; H04W 76/23; H04W 76/38
See application file for complete search history.

(56) References Cited

U.S. PATENT DOCUMENTS

| | | | | |
|---|---|---|---|---|
| 10,849,186 | B2 * | 11/2020 | Dao | H04L 41/0806 |
| 12,356,500 | B2 * | 7/2025 | Velev | H04W 8/26 |
| 2018/0199398 | A1 * | 7/2018 | Dao | H04W 76/27 |
| 2019/0028346 | A1 * | 1/2019 | Pallas | H04L 41/0866 |
| 2022/0248273 | A1 * | 8/2022 | Sama | H04W 36/12 |
| 2025/0031171 | A1 * | 1/2025 | Starsinic | H04L 65/1069 |
| 2026/0150071 | A1 * | 5/2026 | He | H04W 60/06 |

* cited by examiner

*Primary Examiner* — Liton Miah

(57) ABSTRACT

A system described herein may maintain User Equipment ("UE") context information associated with one or more communication sessions between a particular UE and a wireless network, and may detect that one or more triggering events have occurred with respect to the particular UE or the one or more communication sessions. The system may output, based on detecting the one or more triggering events, a status update request. The request may include an identifier of the particular UE and/or an identifier of a particular communication session between the particular UE and the wireless network. The system may receive a response to the status update request, and may selectively remove at least a portion of the maintained UE context information, associated with the one or more communication sessions between the particular UE and the wireless network, based on the response to the status update request.

20 Claims, 11 Drawing Sheets

SYSTEMS AND METHODS FOR UDM/UDR-INITIATED UE CONTEXT MANAGEMENT

BACKGROUND

Wireless networks provide wireless connectivity to User Equipment ("UEs"), such as mobile telephones, tablets, Internet of Things ("IoT") devices, Machine-to-Machine ("M2M") devices, or the like. The wireless networks may establish communication sessions, such as protocol data unit ("PDU") sessions, with UEs in order to send and receive traffic to such UEs. The wireless networks may maintain context information via which active communication sessions are tracked.

DETAILED DESCRIPTION OF EXAMPLE EMBODIMENTS

The following detailed description refers to the accompanying drawings. The same reference numbers in different drawings may identify the same or similar elements.

Figure 1:
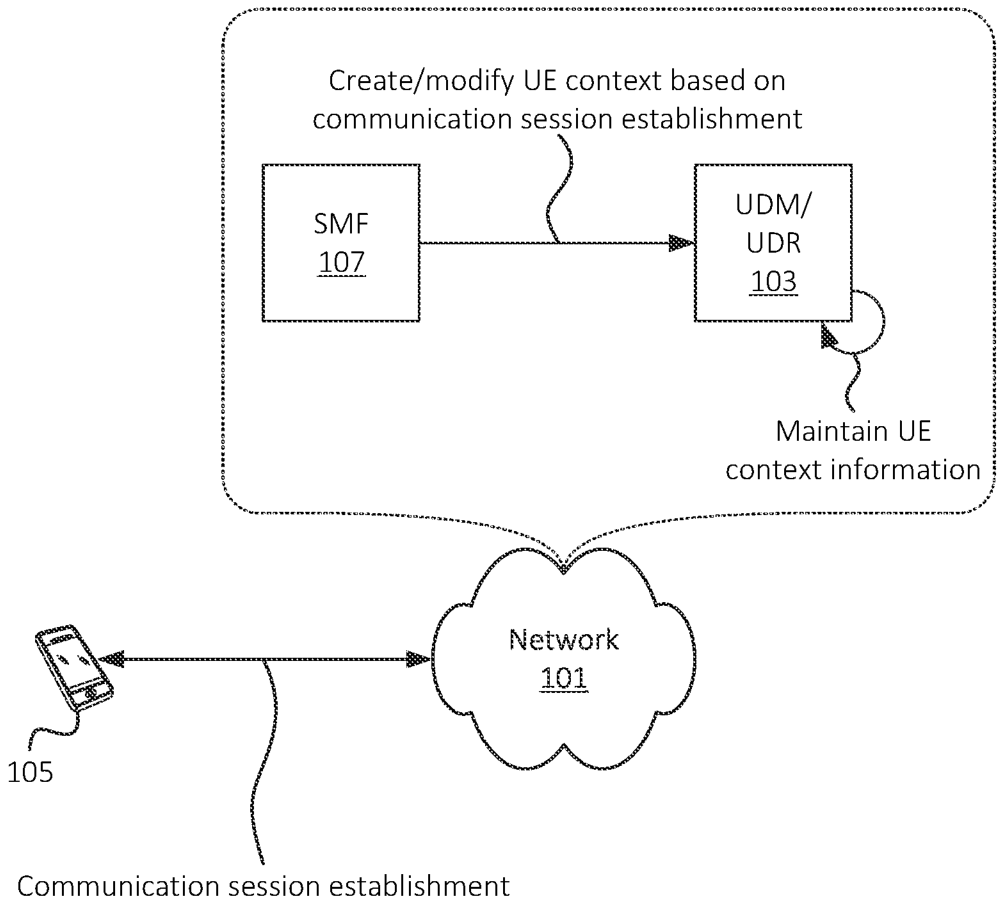
FIGS. 1-3 illustrate an example of a UE information repository of a wireless network maintaining potentially stale UE context information.

Networks, such as wireless networks, may establish communication sessions (e.g., PDU sessions) with UEs, via which traffic may be sent to or received from such UEs. As shown in FIG. 1, a UE information repository of a wireless network (e.g., network 101), such as a Unified Data Management function ("UDM"), a Unified Data Repository ("UDR"), etc. (represented as "UDM/UDR 103"), may maintain information indicating active communication sessions between the wireless network and one or more UEs 105. Other elements of the network 101 may query the UE information repository (e.g., UDM/UDR 103) regarding such communication sessions for purposes such as provisioning or managing resources of network 101, tracking network resource usage by one or more UEs 105, or other purposes. For example, when a communication session is established between UE 105 and network 101, a session management element of the wireless network (e.g., Session Management Function ("SMF") 107) may notify the UE information repository (e.g., UDM/UDR 103) that the communication session has been established between network 101 and UE 105.

UDM/UDR 103 may maintain UE context information, associated with the particular UE 105, indicating that the communication session has been established. The context information may include information such as an identifier of UE 105 (e.g., a Subscription Permanent Identifier ("SUPI"), a Globally Unique Temporary Identifier ("GUTI"), a Mobile Directory Number ("MDN"), etc.), an identifier of the communication session (e.g., a PDU session identifier), an identifier of one or more other network elements associated with UE 105 and/or the communication session (e.g., an identifier of SMF 107, a communication session endpoint such as a User Plane Function ("UPF"), a policy element such as a Policy Control Function ("PCF"), etc.), and/or other information.

Figure 2:
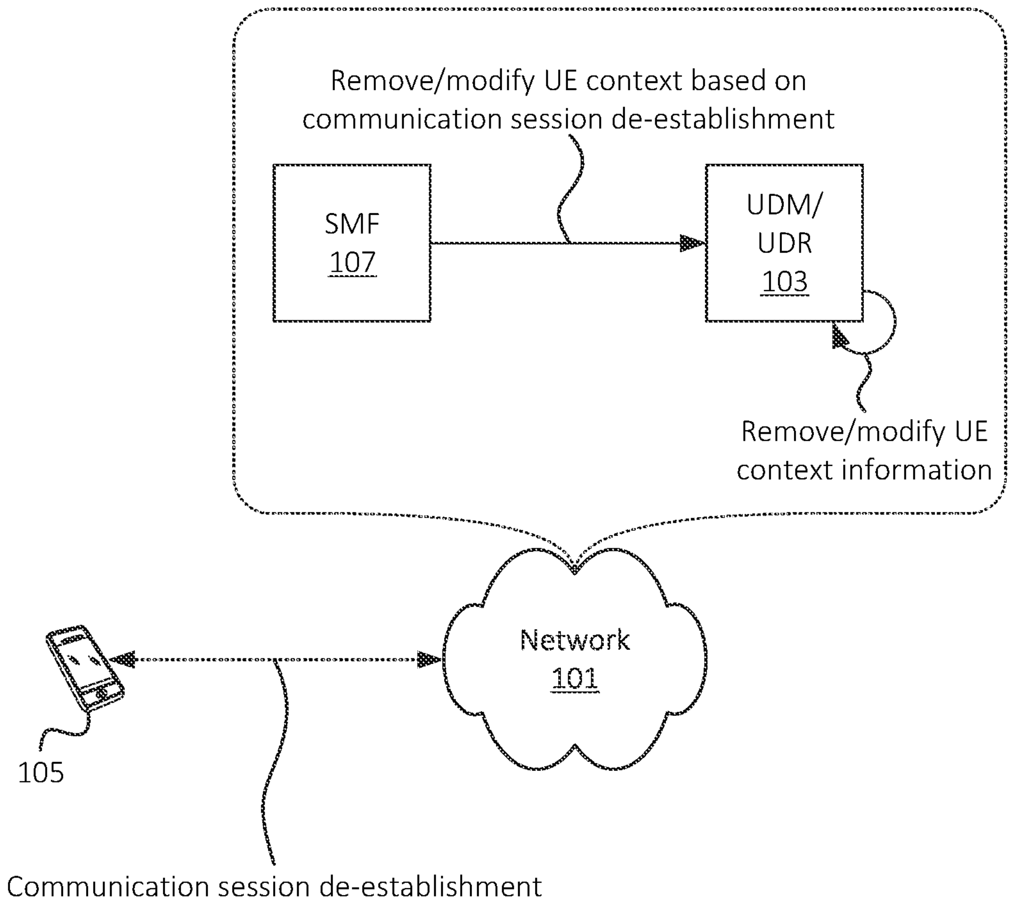

As shown in FIG. 2, when a communication session is de-established (e.g., terminated, removed, torn down, etc.), a session management element of the wireless network SMF 107 may notify the UE information repository (e.g., UDM/UDR 103) that the communication session has been de-established, and UDM/UDR 103 may remove the context information (and/or may modify context information associated with UE 105 to reflect that the communication session is no longer active). In this manner, resources of UDM/UDR 103 that were used to maintain the context information may be made available, thus keeping UDM/UDR 103 operating efficiently.

Figure 3:
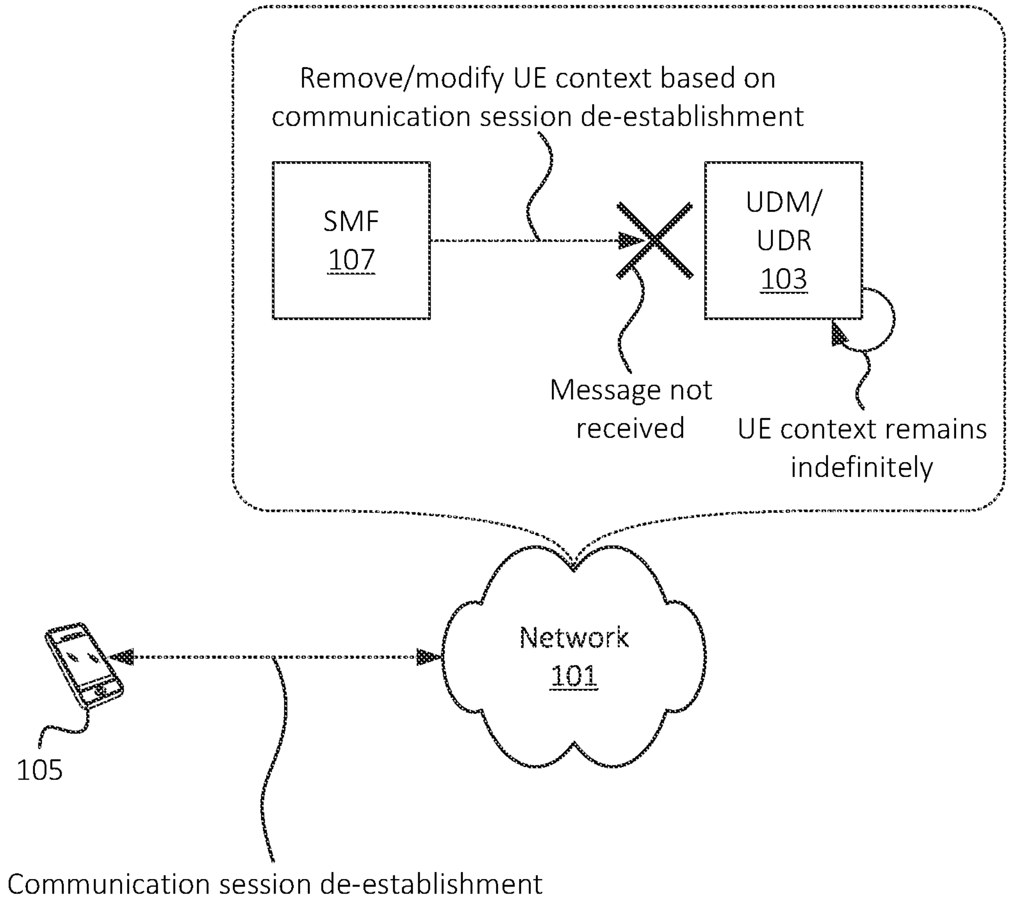

As shown in FIG. 3, situations may arise in which the notification from SMF 107 is not received by UDM/UDR 103. For example, a communication error may occur between SMF 107 and UDM/UDR 103, UDM/UDR 103 may be offline or non-operational when SMF 107 sends the notification to UDM/UDR 103, and/or the notification may not be received by UDM/UDR 103 for some other reason. In such situations, the UE context information for the communication session, which is no longer active, may be maintained by UDM/UDR 103 for a potentially indefinite period of time. Situations in which UDM/UDR 103 retains a large amount of context information for communication sessions that are no longer active may lead to a waste of resources of UDM/UDR 103, the providing of old or outdated information to other elements of network 101, and/or other inefficiencies or errors in the operation of network 101.

Embodiments described herein provide for a robust mechanism by which a UE information repository (e.g., UDM/UDR 103) may confirm that context information, maintained by the UE information repository, is up-to-date and/or accurate, thus providing a backup mechanism for removing context information that is no longer accurate. Such techniques may conserve resources of UDM/UDR 103, thus improving the operation of UDM/UDR 103 and network 101 as a whole.

Figure 4:
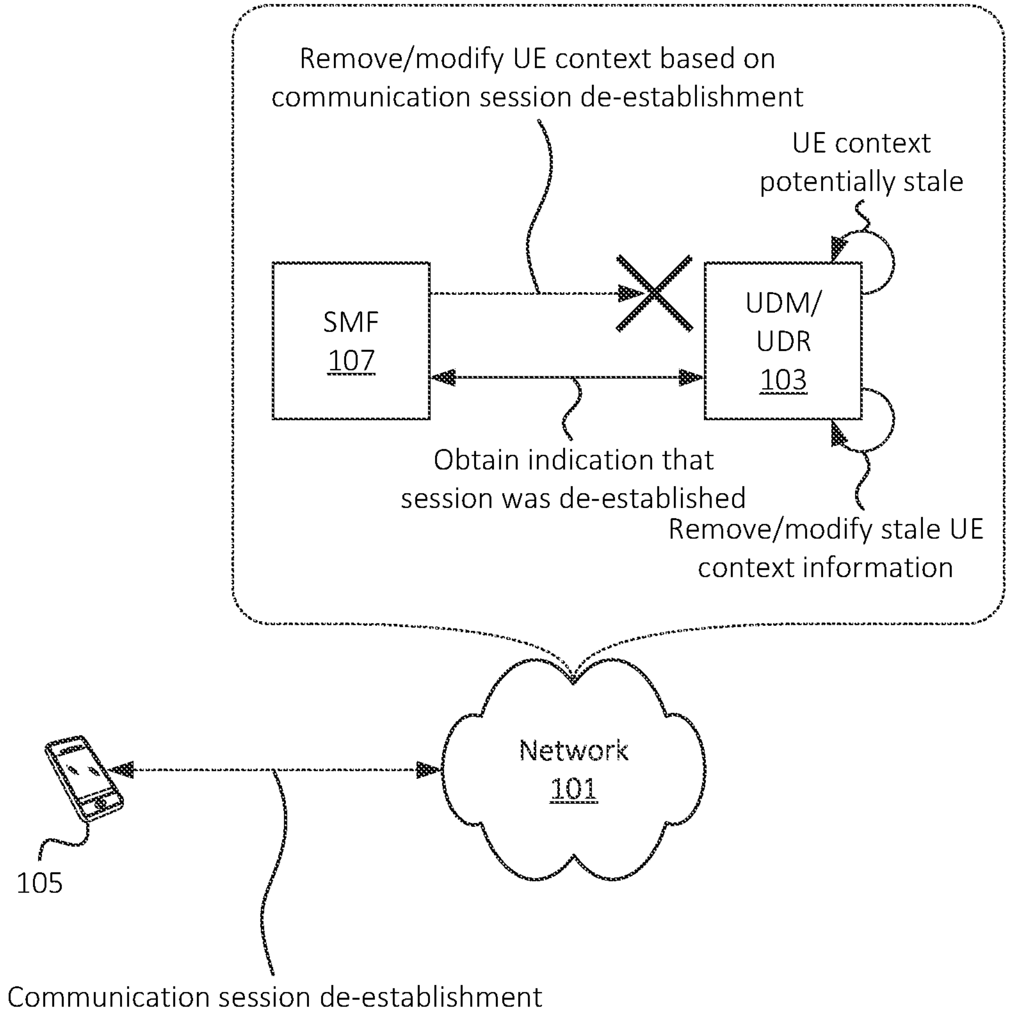
FIG. 4 illustrates an example overview of one or more embodiments described herein.

For example, as shown in FIG. 4, and as similarly provided in the example of FIG. 3, assume that a communication session between UE 105 and network 101 is de-established, removed, ended, etc. SMF 107 may attempt to notify UDM/UDR 103 that the communication session has been de-established, but UDM/UDR 103 may not receive the notification due to a communication error or for some other reason. In accordance with some embodiments, UDM/UDR 103 may detect, at some point, that the context information associated with UE 105 and/or the communication session is potentially "stale," out-of-date, incorrect, etc. For example, UDM/UDR 103 may detect that a threshold duration of time has passed (e.g., six hours, 24 hours, etc.) since UDM/UDR 103 received a notification from SMF 107 that the communication session has been established.

Based on detecting that the context information is potentially stale, UDM/UDR 103 may communicate with SMF 107 to determine whether the communication session is still active. For example, UDM/UDR 103 may output a request, query, etc. with an identifier of UE 105 and/or the communication session, and SMF 107 may respond, in this example, with an indication that the communication session is not active, was de-established, does not exist, is not recognized, etc. In other words, UDM/UDR 103 may receive confirmation that the context information for UE 105 is stale. Accordingly, UDM/UDR 103 may remove the context information associated with the communication session, and/or may modify context information associated with UE 105 to remove information associated with the communication session. In this manner, UDM/UDR 103 may free up resources that were used in maintaining the context information, and further may be able to provide accurate and up-to-date information regarding UE 105 in response to information requests from other elements of network 101. Further, the techniques described above serve as a back-up or fail-safe in situations where SMF 107 is unsuccessful in notifying UDM/UDR 103 that communication sessions associated with one or more UEs 105 have been de-established.

Figure 5:
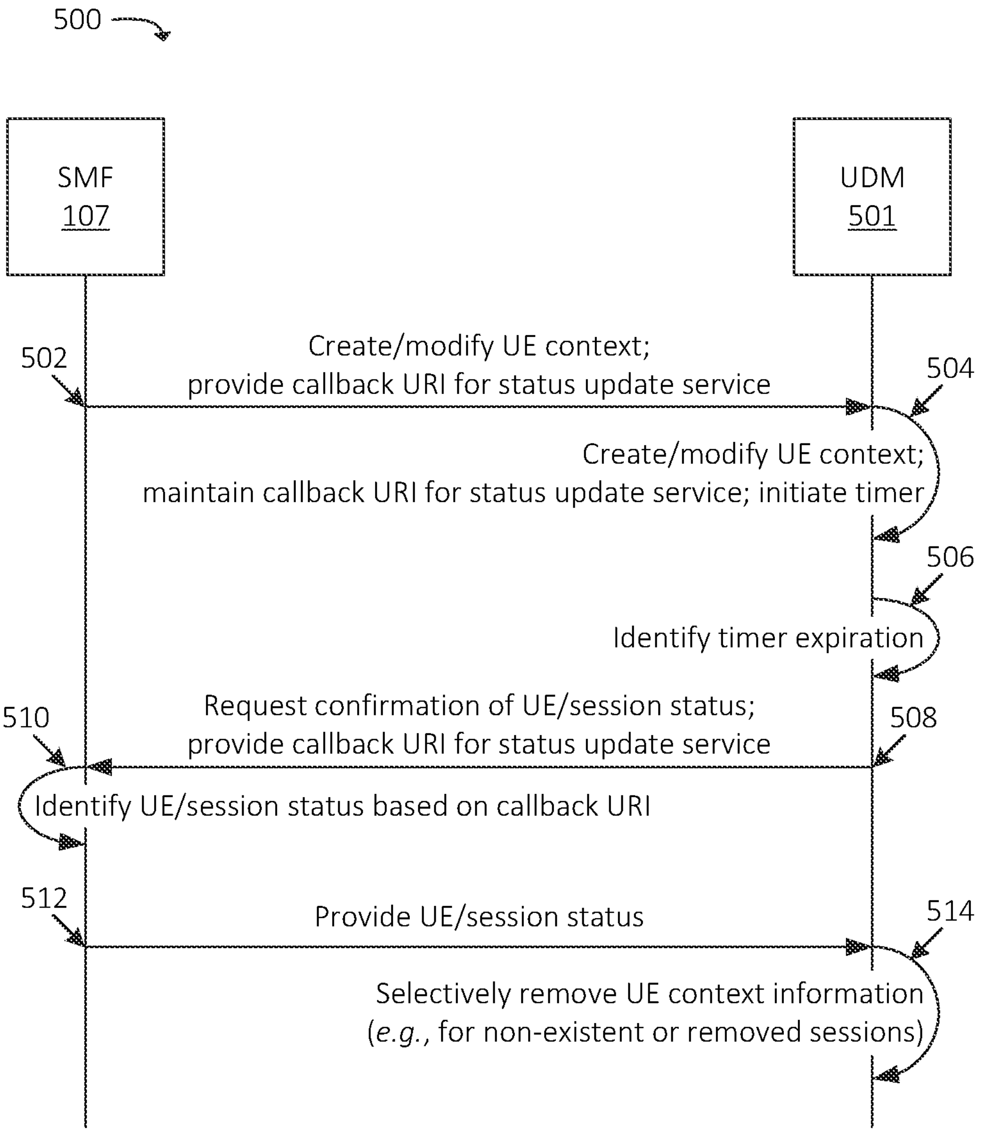
FIGS. 5 and 6 illustrate example signal flows for maintaining up-to-date information at a UE information repository of a wireless network, in accordance with one or more embodiments described herein.
Figure 6:
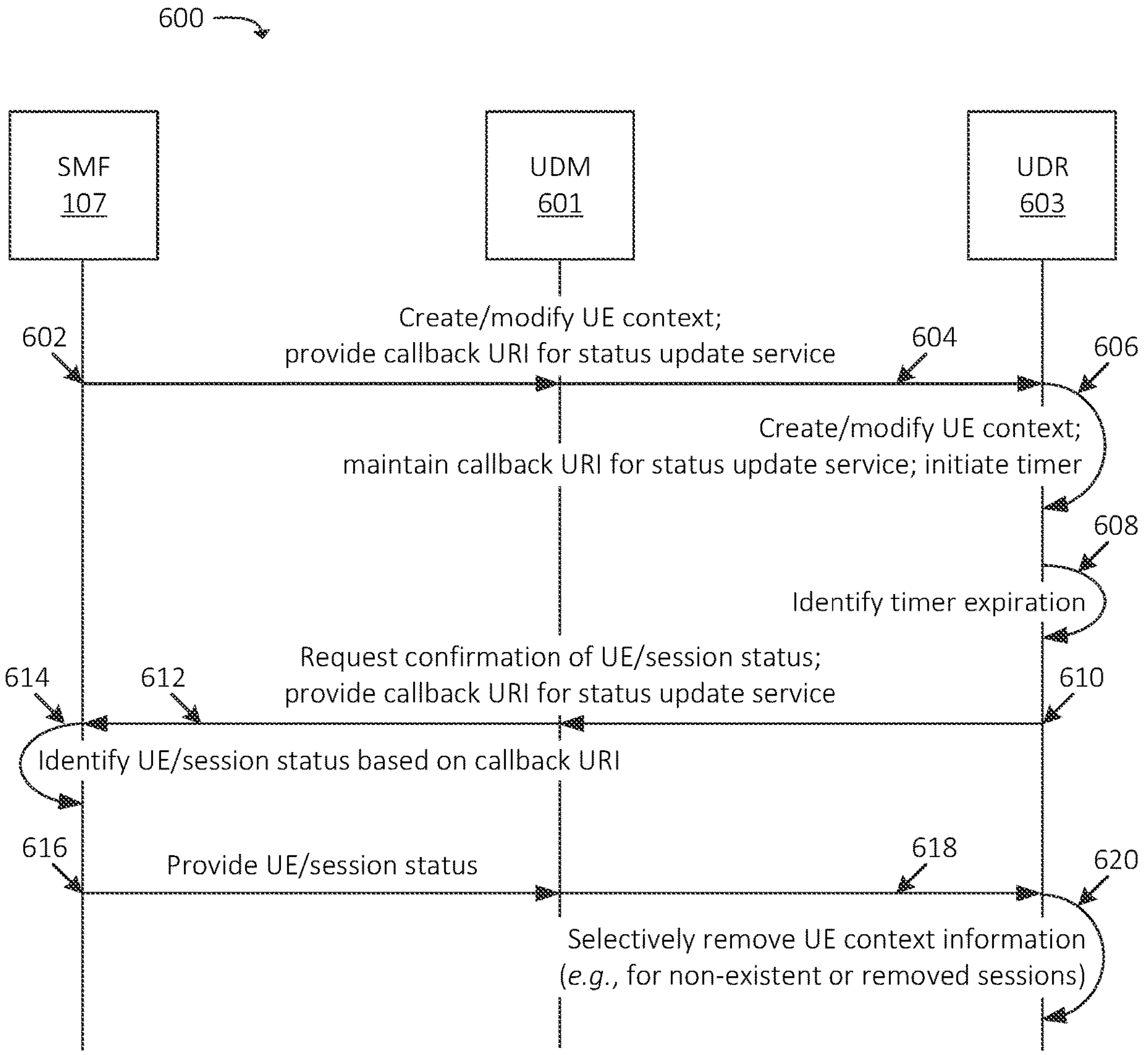

FIG. 5 illustrates an example signal flow 500, between SMF 107 and UDM 501, in accordance with some embodiments. UDM 501 may be implemented in a "stateful" manner, in which UDM 501 maintains UE context information in a local data storage or otherwise discreet data storage that is associated with UDM 501. FIG. 6 illustrates an example signal flow 600, between SMF 107, UDM 601, and UDR 603 in accordance with some embodiments. UDM 601 may be implemented in a "stateless" manner, in which UDR 603 maintains UE context information as a separate element from UDM 601 (e.g., a single instance of UDR 603 may communicate with multiple instances of UDM 601).

As shown in FIG. 5, SMF 107 may output (at 502) a request to create and/or modify UE context information, such as based on the establishment of a communication session (e.g., a PDU session) between network 101 and a particular UE 105. In accordance with some embodiments, SMF 107 may implement a status update service, whereby UDM 501 may request updated information associated with one or more UEs 105 and/or communication sessions. SMF 107 may provide (at 502) an identifier, flag, etc. associated with the status update service provided by SMF 107. In some embodiments, the identifier, flag, etc. may include a Uniform Resource Identifier ("URI"), such as a callback URI, or other suitable type of identifier. In some embodiments, SMF 107 may generate or select a unique identifier (e.g., callback URI) for a particular UE 105 and/or communication session. In this manner, different UEs 105, and/or different communication sessions associated with the same UE 105, may be associated with different identifiers. In some embodiments, different identifiers (e.g., callback URIs) may be associated with different communication session parameters, such as different Quality of Service ("QoS") parameters, different network slices, different traffic types, different UE categories or groups (e.g., IoT devices, mobile phones, UEs associated with a "first responder" category, UEs associated with an "enterprise" category, etc.). On the other hand, in some embodiments, SMF 107 may provide an identifier that is associated with the status update service, and is not specifically associated with a particular UE 105 or communication session.

In some embodiments, the message (at 502) may include one or more Hypertext Transfer Protocol ("HTTP") messages. For example, in some embodiments, the one or more HTTP messages may include an HTTP PUT request with the callback URI associated with the status update service.

Based on receiving the message (at 502) from SMF 107. UDM 501 may create and/or modify UE context information, indicating that the particular UE 105 is associated with the indicated communication session. For example, UDM 501 may modify existing context information for UE 105 to reflect that UE 105 is associated with the communication session, or may create new context information for UE 105 if UDM 501 does not already maintain context information for UE 105. As discussed above, the context information may include one or more identifiers of UE 105, one or more identifiers of the communication session, identifiers of one or more network elements that are associated with UE 105 or the communication session, etc. UDM 501 may also maintain (at 504) the identifier associated with the status update service (e.g., the callback URI), as provided (at 502) by SMF 107. In this manner, UDM 501 may maintain information associating UE 105 and/or the communication session with the status update service (e.g., the identifier) provided by SMF 107.

In accordance with some embodiments, UDM 501 may further initiate (at 504) a status update timer based on receiving (at 502) the identifier of the status update service. In some embodiments, the duration of the timer may be a static or pre-defined duration. In some embodiments, status update service identifiers (e.g., callback URIs) may be associated with different durations. For example, one status update service identifier may be associated with a first timer duration (e.g., twelve hours) while another status update service identifier may be associated with a different timer duration (e.g., 24 hours).

In some embodiments, UDM 501 may determine the duration of the timer based on one or more other factors (e.g., in addition to, or in lieu of, the particular status update identifier provided). For example, UDM 501 may identify UE information, as maintained by UDM 501, indicating a device type of UE 105, subscription information associated with UE 105 (e.g., indicating a particular service plan or usage limits), a device type of UE 105 (e.g., mobile phone, IoT device, etc.), location information of UE 105, historical information of UE 105 (e.g., location history, usage metrics, etc.), and/or other information maintained by UDM 501. In some embodiments, UDM 501 may utilize automated techniques, such as artificial intelligence/machine learning ("AI/ML") techniques, to identify the status update timer duration (e.g., based on the particular status update service identifier, one or more attributes of UE 105, and/or other factors).

At some point, UDM 501 may determine (at 506) that the status update timer has expired. As discussed above, such situations may occur when SMF 107 has attempted to notify UDM 501 that the communication session has been de-established, but the attempt has failed for some reason. On the other hand, such situations may also occur when the communication session is, in actuality, still active. In this manner, UDM 501 may determine (at 506) that the UE context information is potentially stale, where the information is "potentially" stale due to the possibility that the communication session may still be active.

Based on identifying (at 506) that the timer has expired, UDM 501 may request (at 508) confirmation of the status of the communication session and/or status update information for UE 105. In doing so, UDM 501 may provide the status update service identifier (e.g., callback URI) provided by SMF 107, an identifier of UE 105, an identifier of the communication session (e.g., a PDU session identifier), and/or other suitable information. In some embodiments, the request (at 508) may include one or more HTTP messages, such as an HTTP POST message that includes the callback URI.

SMF 107 may identify (at 510), based on information maintained by SMF 107 in the course of operation of SMF 107, whether the communication session is still active, and/or may otherwise identify a set of active communication sessions associated with UE 105. For example, SMF 107 may identify (at 510) whether SMF 107 maintains context information or other information associated with the communication session indicated in the status update request (at 508), and/or whether SMF 107 maintains context information associated with any communication sessions associated with UE 105.

In situations where a given communication session was previously de-established, SMF 107 may not maintain context information for such communication session, and may therefore determine that the communication session is not recognized, is not active, or the like. On the other hand, in situations where one or more communication sessions are active for UE 105, SMF 107 may identify that such communication sessions are still active. SMF 107 may utilize the status update service identifier (e.g., the callback URI) as a trigger to check the status of a particular communication session and/or to check whether any communication sessions associated with UE 105 are active.

SMF 107 may provide (at 512) the requested information, which may include an indication of whether a particular communication session is active and/or may include an indication of one or more active communication sessions associated with UE 105 (e.g., a list of all active communication sessions for UE 105). In some embodiments, the response (at 512) may include one or more HTTP messages or other types of messages in response to the HTTP POST message sent (at 508) by UDM 501. In some embodiments, the content of the response may vary based on whether SMF 107 identified (at 510) active communication sessions with respect to UE 105.

For example, in some embodiments, the response may include an acknowledgement, a blank message, or other suitable content when the status update request (at 508) identified one or more particular communication sessions (e.g., one or more particular PDU session identifiers) and when SMF 107 identified (at 510) that all of the indicated communication sessions are still active. In some embodiments, the response may include a list of all active communication sessions (e.g., PDU sessions) associated with UE 105, such as in situations where the status update request (at 508) did not specify any particular communication sessions (e.g., where the status update request includes a request pertaining to UE 105, but not necessarily pertaining to any specific communication sessions).

Similarly, in situations where SMF 107 identifies (at 510) that one or more communication sessions, indicated in the status update request, are active while one or more other communication sessions are not active, SMF 107 may provide (at 512) an indication of the active communication sessions (e.g., PDU session identifiers). On the other hand, in situations where SMF 107 identifies (at 510) that no communication sessions indicated in the status update request (or no communication sessions at all) are active with respect to UE 105, SMF 107 may respond (at 512) with an error code (e.g., CONTEXT_NOT_FOUND) or other type of identifier or status code indicating that no communication sessions were found in response to the status update request.

Based on receiving (at 512) the response from SMF 107, UDM 501 may selectively remove (at 514) UE context information. For example, as discussed above, UDM 501 may remove context information (e.g., communication session identifiers, identifiers of network elements of network 101, etc.) that is associated with communication sessions that have been removed. As discussed above, UDM 501 may, in other words, confirm that certain context information is stale, and may remove the stale information.

Some of the operations of signal flow 600, shown in FIG. 6, are similar to those discussed above with respect to FIG. 5. As noted above, UDM 601 may operate in a stateless manner, in which UDM 601 serves as an interface between UDR 603 and other elements of network 101, such as SMF 107. As shown, SMF 107 may output (at 602) an instruction to create and/or modify UE context information, such as based on the establishment of one or more communication sessions for a particular UE 105. As discussed above, the instruction may include a callback URI associated with a status update service provided by SMF 107. As also as discussed above, the instruction may be provided via one or more HTTP messages, such as one or more HTTP PUT messages. In some embodiments, UDM 601 may maintain information associating the status update service identifier (e.g., the callback URI) with SMF 107.

UDM 601 may forward (at 604) the request to UDR 603. For example, UDM 601 may output an HTTP PUT message or other type of message to UDR 603 with some or all of the information provided (at 602) by SMF 107. UDR 603 may create and/or modify (at 606) context information associated with UE 105 indicating the establishment of the communication session, and may also maintain the provided status update service identifier (e.g., the particular callback URI). As similarly discussed above, UDR 603 may initiate (at 606) a status update timer, which may be based on the status update service identifier, one or more attributes of UE 105, or other suitable factors.

UDR 603 may, at some point, identify (at 608) the expiration of the status update timer, and may accordingly output (at 610) a request for confirmation of the status of the communication session and/or other communication sessions associated with UE 105. For example, UDR 603 may output one or more messages (e.g., one or more HTTP POST messages) to UDM 601, which may include the status update service identifier (e.g., the callback URI). UDM 601 may forward (at 612) the request to SMF 107. For example, UDM 601 may identify that the status update service identifier is associated with SMF 107. Additionally, or alternatively, the request (at 610) may include an identifier of SMF 107, based on which UDM 601 may determine that the request should be forwarded (at 612) to SMF 107.

As similarly discussed above, SMF 107 may identify (at 614) whether a particular communication session is active and/or may identify a list of active communication sessions (if any) associated with UE 105, and may provide (at 616) an indication of whether one or more particular communication sessions are active, and/or may provide the list of active communication sessions associated with UE 105. UDM 601 may forward (at 618) some or all of the information provided (at 616) by SMF 107 to UDR 603, which may selectively remove (at 620) UE context information (e.g., for non-existent or removed communication sessions), as similarly described above.

Figure 7:
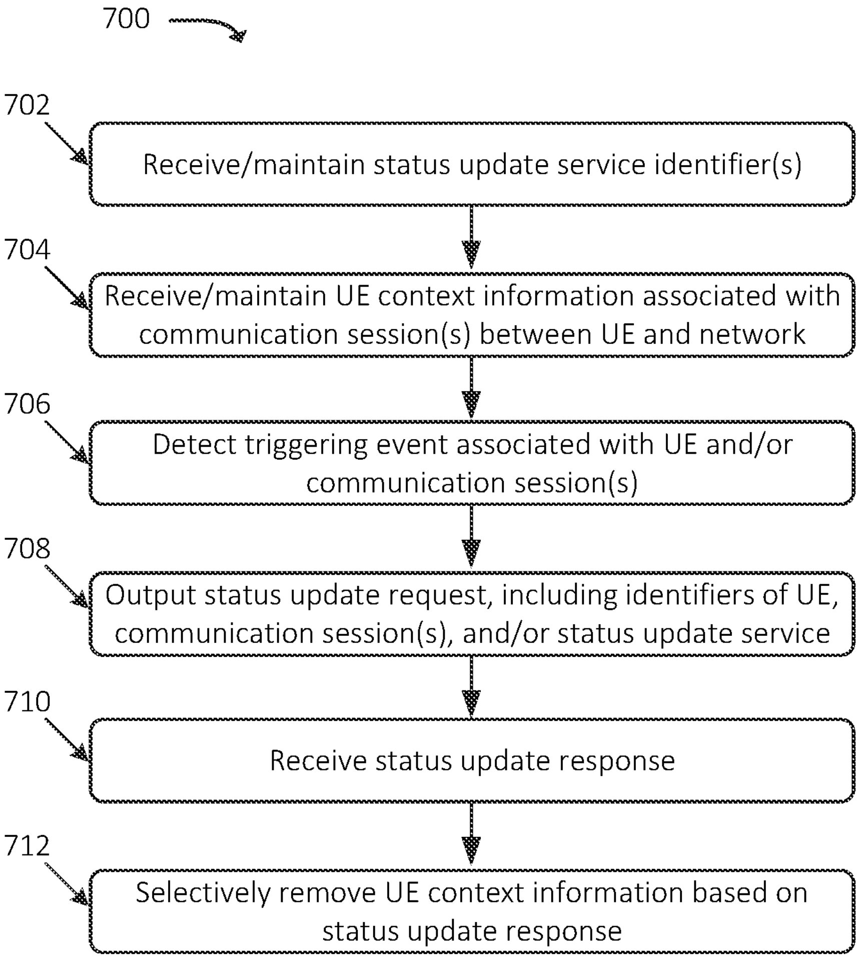
FIG. 7 illustrates an example process for maintaining up-to-date information at a UE information repository of a wireless network, in accordance with some embodiments.

FIG. 7 illustrates an example process 700 for maintaining up-to-date information at a UE information repository of a wireless network. In some embodiments, some or all of process 700 may be performed by UDM 501 (e.g., in embodiments where UDM 501 is implemented in a stateful manner). In some embodiments, one or more other devices may perform some or all of process 700 in concert with, and/or in lieu of, UDM 501. For example, in some embodiments, some or all of the operations described below may be performed by UDR 603, and/or by UDR 603 in concert with UDM 601 (e.g., where UDM 601 is implemented in a stateless manner). For the sake of brevity, FIG. 7 is described in the context of UDM 501 (e.g., a stateful UDM) performing the operations below.

As shown, process 700 may include receiving and/or maintaining (at 702) one or more status update service identifiers. For example, as discussed above, UDM 501 may receive one or more identifiers, such as one or more callback URIs, that are associated with a status update service offered by a session management element of a wireless network (e.g., SMF 107). UDM 501 may receive such identifiers when receiving information indicating that one or more communication sessions (e.g., PDU sessions) have been established between network 101 and one or more UEs 105. As discussed above, different status update service identifiers may be associated with different types of UEs 105, different categories associated with UEs 105 (e.g., a first responder category, an enterprise user category, etc.), different communication session types (e.g., voice, data, streaming, gaming, etc.), and/or other parameters.

Process 700 may further include receiving and/or maintaining (at 704) UE context information associated with one or more communication sessions between one or more UEs 105 and network 101. For example, UDM 501 may receive (e.g., from SMF 107) and maintain identifiers of communication sessions (e.g., PDU session identifiers) between one or more UEs 105 and network 101. In some embodiments, UDM 501 may receive and maintain other information associated with such communication sessions, such as identifiers of such UEs 105, identifiers of network elements that are associated with such UEs 105 and/or the communication session (e.g., network elements that provide or enforce policies associated with the communication sessions such as a PCF, network elements that serve as communication session endpoints such as a UPF, etc.), QoS parameters of communication sessions, network slices associated with communication sessions, and/or other suitable context information. In this manner, UDM 501 may maintain a relatively large amount of context information, reflecting numerous communication sessions between network 101 and several UEs 105.

Process 700 may additionally include detecting (at 706) a triggering event associated with a particular UE 105 and/or with one or more communication sessions associated with the particular UE 105. For example, UDM 501 may detect that context information for a particular communication session associated with a particular UE 105 was created and/or has been maintained by UDM 501 for at least a threshold duration of time (e.g., for at least six hours, for at least 24 hours, etc.). As discussed above, different triggering events (e.g., different timer durations) may be associated with different parameters, such as different types of UEs 105, different QoS parameters of communication sessions, and/or other factors. In some embodiments, triggering events may include other types of triggering events in addition to or in lieu of the length of time since context information has been established for a given communication session (e.g., network load metrics, a request from another network element of network 101, etc.).

Process 700 may also include outputting (at 708) a status update request based on detecting the triggering event. As discussed above, the status update request may include an identifier of UE 105 and/or an identifier of one or more particular communication sessions. For example, UDM 501 may request a status update for all communication sessions associated with UE 105, for multiple (but not all) communication sessions associated with UE 105, or a single communication session associated with UE 105. In some embodiments, the status update request may include one or more status update service identifiers (e.g., as received at 702), such as one or more callback URIs. UDM 501 may output the status update request to SMF 107, in some embodiments, which may identify the status update request based on the status update service identifier. SMF 107 may further identify a list of active communication sessions associated with UE 105, and/or may provide a binary indicator (e.g., "exists" or "does not exist") for one or more particular communication sessions.

Process 700 may further include receiving (at 710) a status update response. For example, UDM 501 may receive (e.g., from SMF 107) a response to the status update request, indicating whether one or more particular communication sessions between UE 105 and network 101 are active (e.g., exist, have not been de-established, are recognized by SMF 107, etc.) or are not active (e.g., do not exist, have been de-established, are not recognized by SMF 107, etc.). Additionally, or alternatively, the status update response may include a list of communication sessions (e.g., a list of communication session identifiers such as PDU session identifiers) that are active between UE 105 and network 101.

Process 700 may additionally include selectively (at 712) removing UE context information based on the status update response. For example, UDM 501 may remove (e.g., may no longer maintain) context information for communication sessions that are no longer active, thus freeing up resources (e.g., memory and/or storage resources) that were used to maintain such context information. Further, UDM 501 may continue maintaining context information for communication sessions that are still active (e.g., communication sessions that have not been indicated by the status update response as being inactive, non-existent, not recognized, etc.). In this manner, UDM 501 may continue maintaining up-to-date, accurate context information, even in situations where notifications (e.g., from SMF 107) that particular communication sessions have been de-established.

Figure 8:
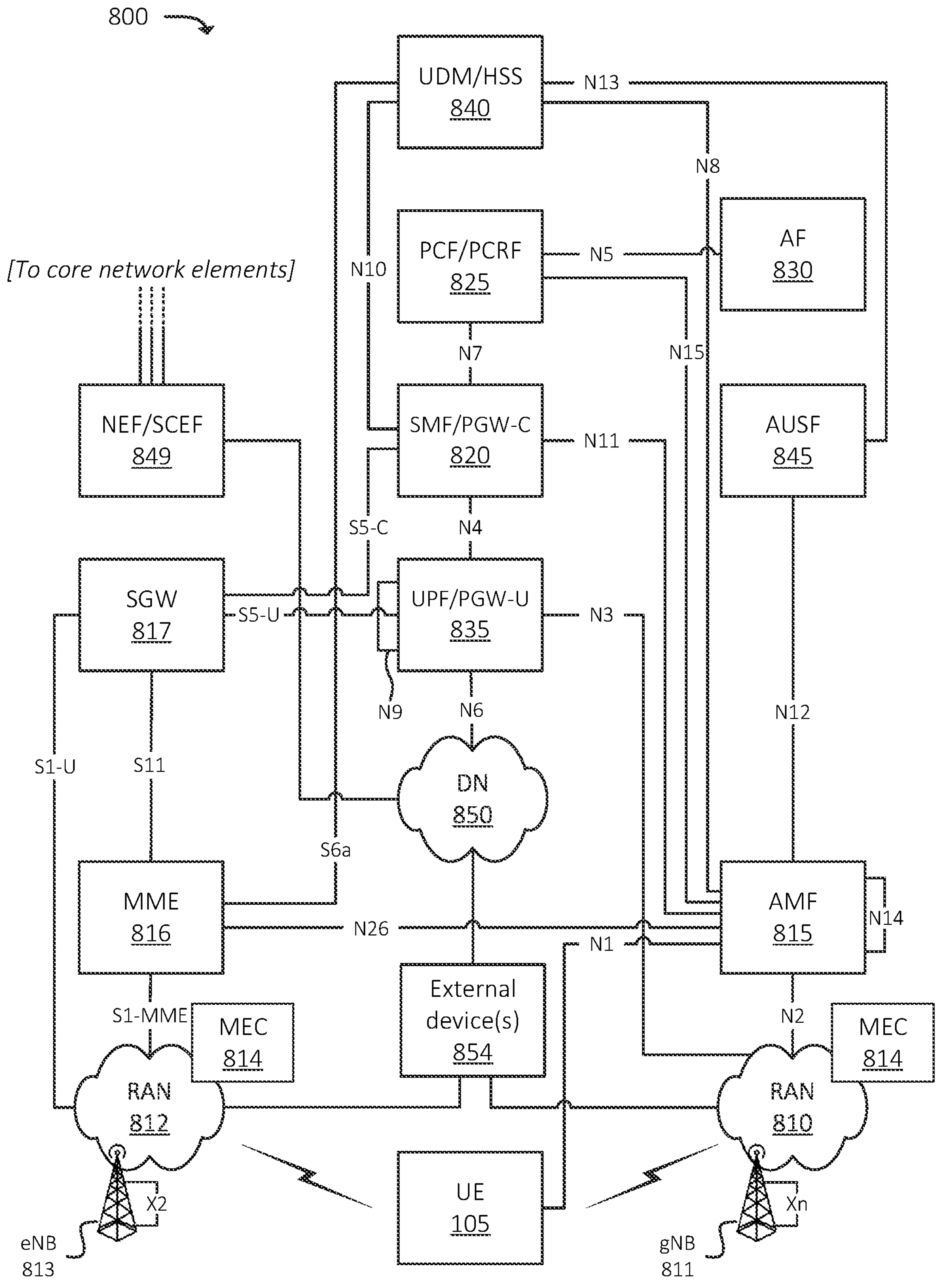
FIGS. 8 and 9 illustrate example environments in which one or more embodiments, described herein, may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 800 may represent or may include a 5G core ("5GC"). As shown, environment 800 may include UE 105, RAN 810 (which may include one or more Next Generation Node Bs ("gNBs") 811), RAN 812 (which may include one or more evolved Node Bs ("eNBs") 813), and various network functions such as Access and Mobility Management Function ("AMF") 815, Mobility Management Entity ("MME") 816, Serving Gateway ("SGW") 817, SMF/Packet Data Network ("PDN") Gateway ("PGW")-Control plane function ("PGW-C") 820, PCF/Policy Charging and Rules Function ("PCRF") 825, Application Function ("AF") 830, UPF/PGW-User plane function ("PGW-U") 835, UDM/Home Subscriber Server ("HSS") 840, Authentication Server Function ("AUSF") 845, and Network Exposure Function ("NEF")/Service Capability Exposure Function ("SCEF") 849. Environment 800 may also include one or more networks, such as Data Network ("DN") 850. Environment 800 may include one or more additional devices or systems communicatively coupled to one or more networks (e.g., DN 850), such as one or more external devices 854.

The example shown in FIG. 8 illustrates one instance of each network component or function (e.g., one instance of SMF/PGW-C 820, PCF/PCRF 825, UPF/PGW-U 835, UDM/HSS 840, and/or AUSF 845). In practice, environment 800 may include multiple instances of such components or functions. For example, in some embodiments, environment 800 may include multiple "slices" of a core network, where each slice includes a discrete and/or logical set of network functions (e.g., one slice may include a first instance of AMF 815, SMF/PGW-C 820, PCF/PCRF 825, and/or UPF/PGW-U 835, while another slice may include a second instance of AMF 815, SMF/PGW-C 820, PCF/PCRF 825, and/or UPF/PGW-U 835). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. In some implementations, one or more devices of environment 800 may be physically integrated in, and/or may be physically attached to, one or more other devices of environment 800. Alternatively, or additionally, one or more of the devices of environment 800 may perform one or more network functions described as being performed by another one or more of the devices of environment 800.

Additionally, one or more elements of environment 800 may be implemented in a virtualized and/or containerized manner. For example, one or more of the elements of environment 800 may be implemented by one or more Virtualized Network Functions ("VNFs"), Cloud-Native Network Functions ("CNFs"), etc. In such embodiments, environment 800 may include, may implement, and/or may be communicatively coupled to an orchestration platform that provisions hardware resources, installs containers or applications, performs load balancing, and/or otherwise manages the deployment of such elements of environment 800. In some embodiments, such orchestration and/or management of such elements of environment 800 may be performed by, or in conjunction with, the open-source Kubernetes® application programming interface ("API") or some other suitable virtualization, containerization, and/or orchestration system.

Elements of environment 800 may interconnect with each other and/or other devices via wired connections, wireless connections, or a combination of wired and wireless connections. Examples of interfaces or communication pathways between the elements of environment 800, as shown in FIG. 8, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 8, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 800 may be, may include, may be implemented by, and/or may be communicatively coupled to network 101.

UE 105 may include a computation and communication device, such as a wireless mobile communication device that is capable of communicating with RAN 810, RAN 812, and/or DN 850. UE 105 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, a Machine-to-Machine ("M2M") device, or the like), a Fixed Wireless Access ("FWA") device, or another type of mobile computation and communication device. UE 105 may send traffic to and/or receive traffic (e.g., user plane traffic) from DN 850 via RAN 810, RAN 812, and/or UPF/PGW-U 835.

RAN 810 may be, or may include, a 5G RAN that includes one or more base stations (e.g., one or more gNBs 811), via which UE 105 may communicate with one or more other elements of environment 800. UE 105 may communicate with RAN 810 via an air interface (e.g., as provided by gNB 811). For instance, RAN 810 may receive traffic (e.g., user plane traffic such as voice call traffic, data traffic, messaging traffic, etc.) from UE 105 via the air interface, and may communicate the traffic to UPF/PGW-U 835 and/or one or more other devices or networks. Further, RAN 810 may receive signaling traffic, control plane traffic, etc. from UE 105 via the air interface, and may communicate such signaling traffic, control plane traffic, etc. to AMF 815 and/or one or more other devices or networks. Additionally, RAN 810 may receive traffic intended for UE 105 (e.g., from UPF/PGW-U 835, AMF 815, and/or one or more other devices or networks) and may communicate the traffic to UE 105 via the air interface.

RAN 812 may be, or may include, a LTE RAN that includes one or more base stations (e.g., one or more eNBs 813), via which UE 105 may communicate with one or more other elements of environment 800. UE 105 may communicate with RAN 812 via an air interface (e.g., as provided by eNB 813). For instance, RAN 812 may receive traffic (e.g., user plane traffic such as voice call traffic, data traffic, messaging traffic, signaling traffic, etc.) from UE 105 via the air interface, and may communicate the traffic to UPF/PGW-U 835 (e.g., via SGW 817) and/or one or more other devices or networks. Further, RAN 812 may receive signaling traffic, control plane traffic, etc. from UE 105 via the air interface, and may communicate such signaling traffic, control plane traffic, etc. to MME 816 and/or one or more other devices or networks. Additionally, RAN 812 may receive traffic intended for UE 105 (e.g., from UPF/PGW-U 835, MME 816, SGW 817, and/or one or more other devices or networks) and may communicate the traffic to UE 105 via the air interface.

One or more RANs of environment 800 (e.g., RAN 810 and/or RAN 812) may include, may implement, and/or may otherwise be communicatively coupled to one or more edge computing devices, such as one or more Multi-Access/Mobile Edge Computing ("MEC") devices (referred to sometimes herein simply as "MECs") 814. MECs 814 may be co-located with wireless network infrastructure equipment of RANs 810 and/or 812 (e.g., one or more gNBs 811 and/or one or more eNBs 813, respectively). Additionally, or alternatively, MECs 814 may otherwise be associated with geographical regions (e.g., coverage areas) of wireless network infrastructure equipment of RANs 810 and/or 812. In some embodiments, one or more MECs 814 may be implemented by the same set of hardware resources, the same set of devices, etc. that implement wireless network infrastructure equipment of RANs 810 and/or 812. In some embodiments, one or more MECs 814 may be implemented by different hardware resources, a different set of devices, etc. from hardware resources or devices that implement wireless network infrastructure equipment of RANs 810 and/or 812. In some embodiments, MECs 814 may be communicatively coupled to wireless network infrastructure equipment of RANs 810 and/or 812 (e.g., via a high-speed and/or low-latency link such as a physical wired interface, a high-speed and/or low-latency wireless interface, or some other suitable communication pathway).

MECs 814 may include hardware resources (e.g., configurable or provisionable hardware resources) that may be configured to provide services and/or otherwise process traffic to and/or from UE 105, via RAN 810 and/or 812. For example, RAN 810 and/or 812 may route some traffic from UE 105 (e.g., traffic associated with one or more particular services, applications, application types, etc.) to a respective MEC 814 instead of to core network elements of 800 (e.g., UPF/PGW-U 835). MEC 814 may accordingly provide services to UE 105 by processing such traffic, performing one or more computations based on the received traffic, and providing traffic to UE 105 via RAN 810 and/or 812. MEC 814 may include, and/or may implement, some or all of the functionality described above with respect to UPF/PGW-U 835, AF 830, one or more application servers, and/or one or more other devices, systems, VNFs, CNFs, etc. In this manner, ultra-low latency services may be provided to UE 105, as traffic does not need to traverse links (e.g., backhaul links) between RAN 810 and/or 812 and the core network.

AMF 815 may include one or more devices, systems, VNFs, CNFs, etc., that perform operations to register UE 105 with the 5G network, to establish bearer channels associated with a session with UE 105, to hand off UE 105 from the 5G network to another network, to hand off UE 105 from the other network to the 5G network, manage mobility of UE 105 between RANs 810 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, CNFs, etc., that perform operations to register UE 105 with the EPC, to establish bearer channels associated with a session with UE 105, to hand off UE 105 from the EPC to another network, to hand off UE 105 from another network to the EPC, manage mobility of UE 105 between RANs 812 and/or eNBs 813, and/or to perform other operations.

SGW 817 may include one or more devices, systems, VNFs, CNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, CNFs, etc., that gather, process, store, and/or provide information in a manner described herein. SMF/PGW-C 820 may, for example, facilitate the establishment of communication sessions on behalf of UE 105. In some embodiments, the establishment of communications sessions may be performed in accordance with one or more policies provided by PCF/PCRF 825. In some embodiments, SMF/PGW-C 820 may be, may include, may be implemented by, and/or may otherwise be associated with SMF 107.

PCF/PCRF 825 may include one or more devices, systems, VNFs, CNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, CNFs, etc., that receive, store, and/or provide information that may be used in determining parameters (e.g., quality of service parameters, charging parameters, or the like) for certain applications.

UPF/PGW-U 835 may include one or more devices, systems, VNFs, CNFs, etc., that receive, store, and/or provide data (e.g., user plane data). For example, UPF/PGW-U 835 may receive user plane data (e.g., voice call traffic, data traffic, etc.), destined for UE 105, from DN 850, and may forward the user plane data toward UE 105 (e.g., via RAN 810, SMF/PGW-C 820, and/or one or more other devices). In some embodiments, multiple instances of UPF/PGW-U 835 may be deployed (e.g., in different geographical locations), and the delivery of content to UE 105 may be coordinated via the N9 interface (e.g., as denoted in FIG. 8 by the line marked "N9" originating and terminating at UPF/PGW-U 835). Similarly, UPF/PGW-U 835 may receive traffic from UE 105 (e.g., via RAN 810, RAN 812, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

UDM/HSS 840 and AUSF 845 may include one or more devices, systems, VNFs, CNFs, etc., that manage, update, and/or store, in one or more memory devices associated with AUSF 845 and/or UDM/HSS 840, profile information associated with a subscriber. In some embodiments, UDM/HSS 840 may be, may include, may be implemented by, and/or may otherwise be associated with UDM 501 and/or UDM 601. AUSF 845 and/or UDM/HSS 840 may perform authentication, authorization, and/or accounting operations associated with one or more UEs 105 and/or one or more communication sessions associated with one or more UEs 105.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 105 may communicate, through DN 850, with data servers, other UEs 105, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 105 may communicate.

External devices 854 may include one or more devices or systems that communicate with UE 105 via DN 850 and one or more elements of 800 (e.g., via UPF/PGW-U 835). External devices 854 may include, for example, one or more application servers, content provider systems, web servers, or the like. External devices 854 may, for example, implement "server-side" applications that communicate with "client-side" applications executed by UE 105. External devices 854 may provide services to UE 105 such as gaming services, videoconferencing services, messaging services, email services, web services, and/or other types of services.

In some embodiments, external devices 854 may communicate with one or more elements of 800 (e.g., core network elements) via NEF/SCEF 849. NEF/SCEF 849 include one or more devices, systems, VNFs, CNFs, etc. that provide access to information, APIs, and/or other operations or mechanisms of one or more core network elements to devices or systems that are external to the core network (e.g., to external devices 854 via DN 850). NEF/SCEF 849 may maintain authorization and/or authentication information associated with such external devices or systems, such that NEF/SCEF 849 is able to provide information, that is authorized to be provided, to the external devices or systems. For example, a given external device 854 may request particular information associated with one or more core network elements. NEF/SCEF 849 may authenticate the request and/or otherwise verify that external device 854 is authorized to receive the information, and may request, obtain, or otherwise receive the information from the one or more core network elements. External device 854 may, in some situations, subscribe to particular types of requested information provided the one or more core network elements, and the one or more core network elements may provide (e.g., "push") the requested information to NEF/SCEF 849 (e.g., in a periodic or otherwise ongoing basis).

In some embodiments, external devices 854 may communicate with one or more elements of RAN 810 and/or 812 via an API or other suitable interface. For example, a given external device 854 may provide instructions, requests, etc. to RAN 810 and/or 812 to provide one or more services via one or more respective MECs 814. In some embodiments, such instructions, requests, etc. may include QoS parameters, Service Level Agreements ("SLAs"), etc. (e.g., maximum latency thresholds, minimum throughput thresholds, etc.) associated with the services.

Figure 9:
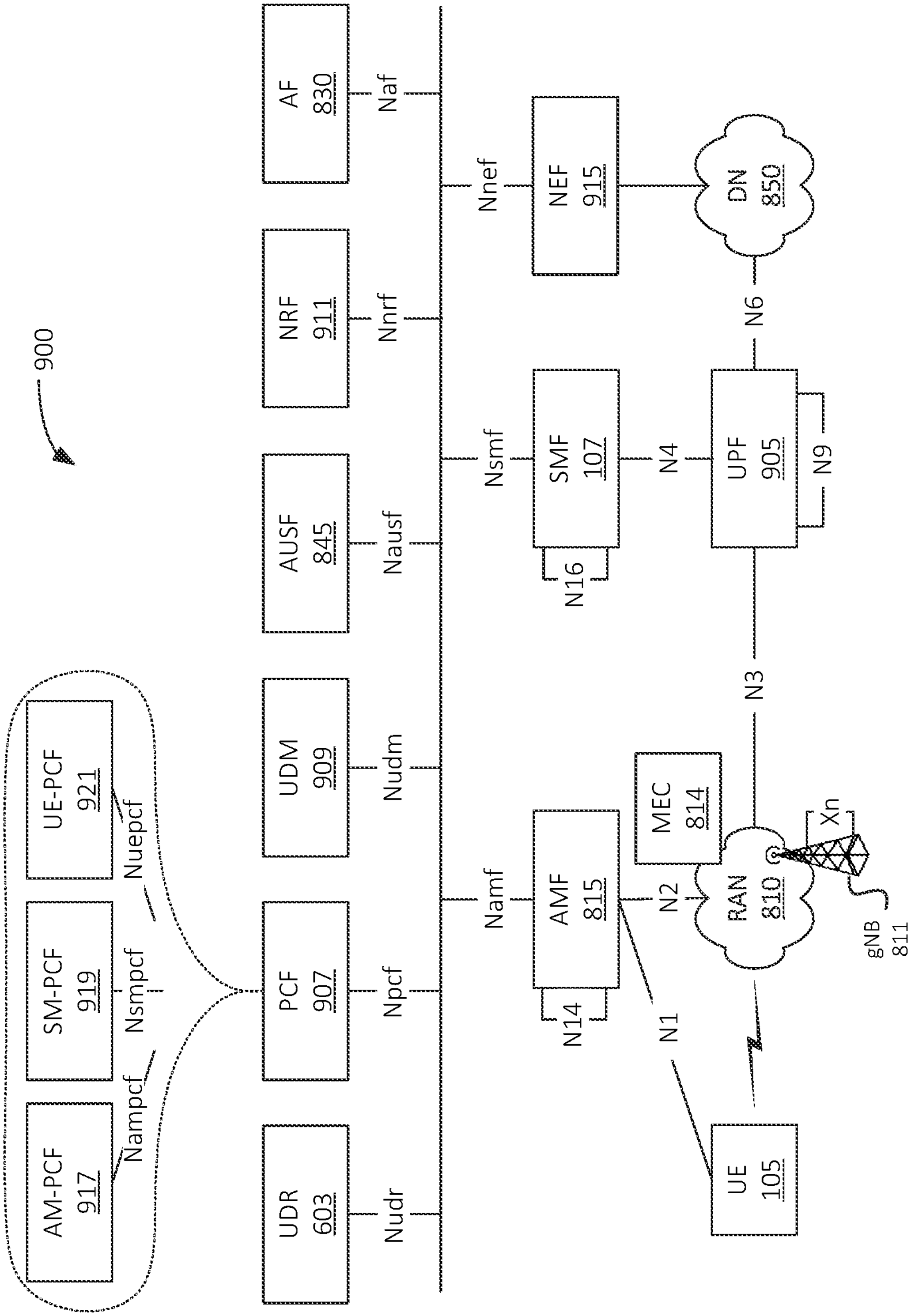

FIG. 9 illustrates another example environment 900, in which one or more embodiments may be implemented. In some embodiments, environment 900 may correspond to a 5G network, and/or may include elements of a 5G network. In some embodiments, environment 900 may correspond to a 5G SA architecture. In some embodiments, environment 900 may include a 5GC, in which 5GC network elements perform one or more operations described herein.

As shown, environment 900 may include UE 105, RAN 810 (which may include one or more gNBs 811 or other types of wireless network infrastructure) and various network functions, which may be implemented as VNFs, CNFs, etc. Such network functions may include AMF 815, SMF 107, UPF 905, PCF 907, UDM 909, AUSF 845, Network Repository Function ("NRF") 911, AF 830, UDR 603, and NEF 915. Environment 900 may also include or may be communicatively coupled to one or more networks, such as Data Network DN 850.

The example shown in FIG. 9 illustrates one instance of each network component or function (e.g., one instance of SMF 107, UPF 905, PCF 907, UDM 909, AUSF 845, etc.). In practice, environment 900 may include multiple instances of such components or functions. For example, in some embodiments, environment 900 may include multiple "slices" of a core network, where each slice includes a discrete and/or logical set of network functions (e.g., one slice may include a first instance of SMF 107, PCF 907, UPF 905, etc., while another slice may include a second instance of SMF 107, PCF 907, UPF 905, etc.). Additionally, or alternatively, one or more of the network functions of environment 900 may implement multiple network slices. The different slices may provide differentiated levels of service, such as service in accordance with different QoS parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. In some implementations, one or more devices of environment 900 may be physically integrated in, and/or may be physically attached to, one or more other devices of environment 900. Alternatively, or additionally, one or more of the devices of environment 900 may perform one or more network functions described as being performed by another one or more of the devices of environment 900.

Elements of environment 900 may interconnect with each other and/or other devices via wired connections, wireless connections, or a combination of wired and wireless connections. Examples of interfaces or communication pathways between the elements of environment 900, as shown in FIG. 9, may include interfaces shown in FIG. 9 and/or one or more interfaces not explicitly shown in FIG. 9. These interfaces may include interfaces between specific network functions, such as an N1 interface, an N2 interface, an N3 interface, an N6 interface, an N9 interface, an N14 interface, an N16 interface, and/or one or more other interfaces. In some embodiments, one or more elements of environment 900 may communicate via a service-based architecture ("SBA"), in which a routing mesh or other suitable routing mechanism may route communications to particular network functions based on interfaces or identifiers associated with such network functions. Such interfaces may include or may be referred to as SBIs, including an Namf interface (e.g., indicating communications to be routed to AMF 815), an Nudm interface (e.g., indicating communications to be routed to UDM 909), an Npcf interface, an Nupf interface, an Nnef interface, an Nsmf interface, an Nnrf interface, an Nudr interface, an Naf interface, and/or one or more other SBIs. In some embodiments, environment 900 may be, may include, may be implemented by, and/or may be communicatively coupled to network 101.

UPF 905 may include one or more devices, systems, VNFs, CNFs, etc., that receive, route, process, and/or forward traffic (e.g., user plane traffic). As discussed above, UPF 905 may communicate with UE 105 via one or more communication sessions, such as PDU sessions. Such PDU sessions may be associated with a particular network slice or other suitable QoS parameters, as noted above. UPF 905 may receive downlink user plane traffic (e.g., voice call traffic, data traffic, etc. destined for UE 105) from DN 850, and may forward the downlink user plane traffic toward UE 105 (e.g., via RAN 810). In some embodiments, multiple UPFs 905 may be deployed (e.g., in different geographical locations), and the delivery of content to UE 105 may be coordinated via the N9 interface. Similarly, UPF 905 may receive uplink traffic from UE 105 (e.g., via RAN 810), and may forward the traffic toward DN 850. In some embodiments, UPF 905 may implement, may be implemented by, may be communicatively coupled to, and/or may otherwise be associated with UPF/PGW-U 835. In some embodiments, UPF 905 may communicate (e.g., via the N4 interface) with SMF 107, regarding user plane data processed by UPF 905 (e.g., to provide analytics or reporting information, to receive policy and/or authorization information, etc.).

PCF 907 may include one or more devices, systems, VNFs, CNFs, etc., that aggregate, derive, generate, etc. policy information associated with the 5GC and/or UEs 105 that communicate via the 5GC and/or RAN 810. PCF 907 may receive information regarding policies and/or subscriptions from one or more sources, such as subscriber databases (e.g., UDM 909, UDR 603, etc.), and/or from one or more users such as, for example, an administrator associated with PCF 907. In some embodiments, the functionality of PCF 907 may be split into multiple network functions or subsystems, such as access and mobility PCF ("AM-PCF") 917, session management PCF ("SM-PCF") 919, UE PCF ("UE-PCF") 921, and so on. Such different "split" PCFs may be associated with respective SBIs (e.g., AM-PCF 917 may be associated with an Nampcf SBI, SM-PCF 919 may be associated with an Nsmpcf SBI, UE-PCF 921 may be associated with an Nuepcf SBI, and so on) via which other network functions may communicate with the split PCFs. The split PCFs may maintain information regarding policies associated with different devices, systems, and/or network functions.

NRF 911 may include one or more devices, systems, VNFs, CNFs, etc. that maintain routing and/or network topology information associated with the 5GC. For example, NRF 911 may maintain and/or provide IP addresses of one or more network functions, routes associated with one or more network functions, discovery and/or mapping information associated with particular network functions or network function instances (e.g., whereby such discovery and/or mapping information may facilitate the SBA), and/or other suitable information.

UDR 603 may include one or more devices, systems, VNFs, CNFs, etc. that provide user and/or subscriber information, based on which PCF 907 and/or other elements of environment 900 may determine access policies, QoS policies, charging policies, or the like. In some embodiments, UDR 603 may receive such information from UDM 909 and/or one or more other sources. In some embodiments, UDM 909 may be, may include, may be implemented by, and/or may otherwise be associated with UDM 501 and/or UDM 601.

NEF 915 may include one or more devices, systems, VNFs, CNFs, etc. that provide access to information, APIs, and/or other operations or mechanisms of the 5GC to devices or systems that are external to the 5GC. NEF 915 may maintain authorization and/or authentication information associated with such external devices or systems, such that NEF 915 is able to provide information, that is authorized to be provided, to the external devices or systems. Such information may be received from other network functions of the 5GC (e.g., as authorized by an administrator or other suitable entity associated with the 5GC), such as SMF 107, UPF 905, a charging function ("CHF") of the 5GC, and/or other suitable network function. NEF 915 may communicate with external devices or systems (e.g., external devices 854) via DN 850 and/or other suitable communication pathways.

While environment 900 is described in the context of a 5GC, as noted above, environment 900 may, in some embodiments, include or implement one or more other types of core networks. For example, in some embodiments, environment 900 may be or may include a converged packet core, in which one or more elements may perform some or all of the functionality of one or more 5GC network functions and/or one or more EPC network functions. For example, in some embodiments, AMF 815 may include, may implement, may be implemented by, and/or may otherwise be associated with MME 816; SMF 107 may include, may implement, may be implemented by, and/or may otherwise be associated with SGW 817; PCF 907 may include, may implement, may be implemented by, and/or may otherwise be associated with a PCRF (e.g., PCF/PCRF 825); NEF 915 may include, may implement, may be implemented by, and/or may otherwise be associated with a SCEF (e.g., NEF/SCEF 849); and so on.

Figure 10:
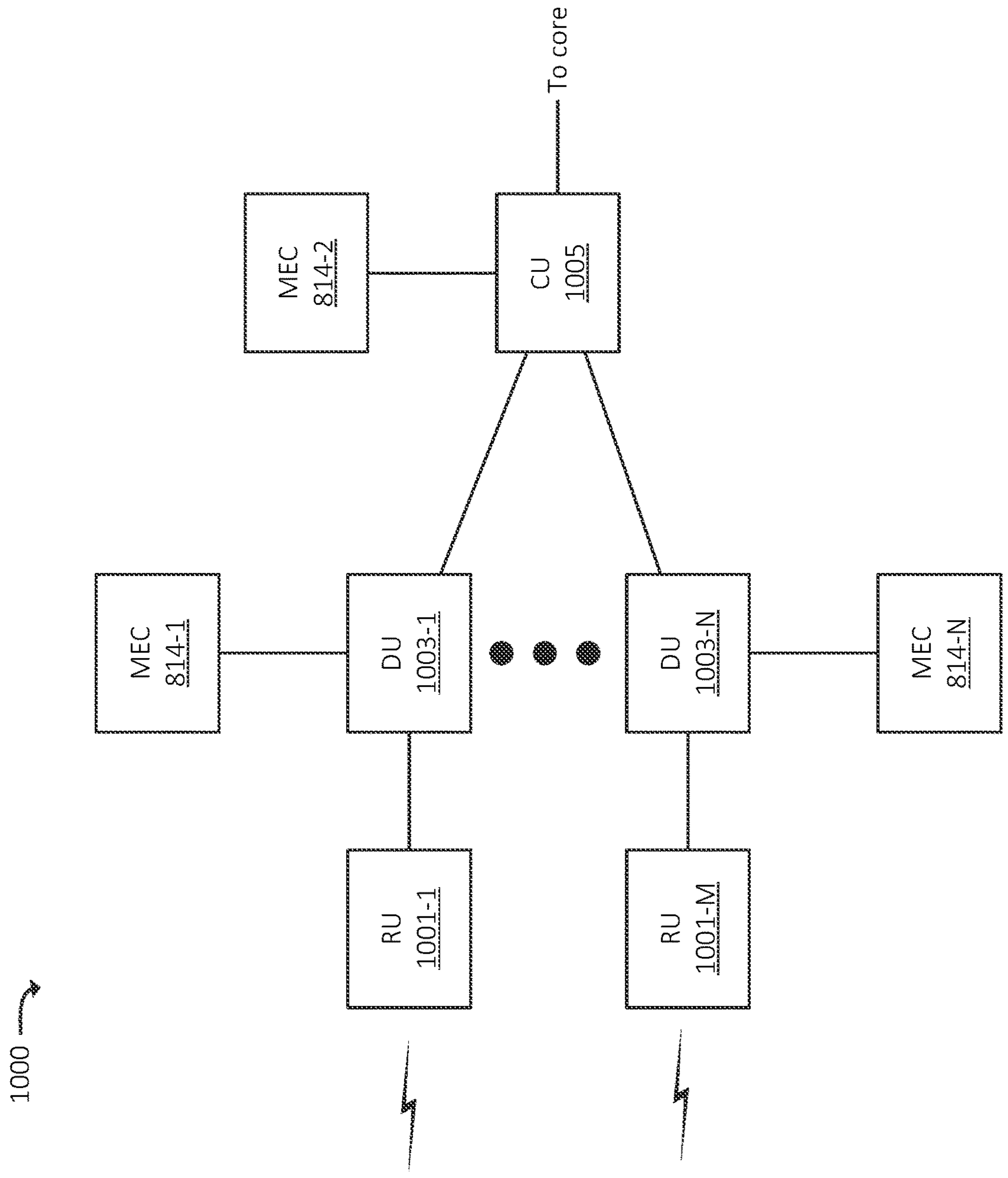
FIG. 10 illustrates an example arrangement of a radio access network ("RAN"), in accordance with some embodiments.

FIG. 10 illustrates an example RAN environment 1000, which may be included in and/or implemented by one or more RANs (e.g., RAN 810 or some other RAN). In some embodiments, a particular RAN 810 may include one RAN environment 1000. In some embodiments, a particular RAN 810 may include multiple RAN environments 1000. In some embodiments, RAN environment 1000 may correspond to a particular gNB 811 of RAN 810. In some embodiments, RAN environment 1000 may correspond to multiple gNBs 811. In some embodiments, RAN environment 1000 may correspond to one or more other types of base stations of one or more other types of RANs. As shown, RAN environment 1000 may include Central Unit ("CU") 1005, one or more Distributed Units ("DUs") 1003-1 through 1003-N (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 815 and/or UPF 905). In the uplink direction (e.g., for traffic from UEs 105 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 105, and may determine which DU(s) 1003 should receive the downlink traffic. DU 1003 may include one or more devices that transmit traffic between a core network (e.g., via CU 1005) and UE 105 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 105.

RU 1001 may include hardware circuitry (e.g., one or more RF transceivers, antennas, radios, and/or other suitable hardware) to communicate wirelessly (e.g., via an RF interface) with one or more UEs 105, one or more other DUs 1003 (e.g., via RUs 1001 associated with DUs 1003), and/or any other suitable type of device. In the uplink direction, RU 1001 may receive traffic from UE 105 and/or another DU 1003 via the RF interface and may provide the traffic to DU 1003. In the downlink direction, RU 1001 may receive traffic from DU 1003, and may provide the traffic to UE 105 and/or another DU 1003.

One or more elements of RAN environment 1000 may, in some embodiments, be communicatively coupled to one or more MECs 814. For example, DU 1003-1 may be communicatively coupled to MEC 814-1, DU 1003-N may be communicatively coupled to MEC 814-N, CU 1005 may be communicatively coupled to MEC 814-2, and so on. MECs 814 may include hardware resources (e.g., configurable or provisionable hardware resources) that may be configured to provide services and/or otherwise process traffic to and/or from UE 105, via a respective RU 1001.

For example, DU 1003-1 may route some traffic, from UE 105, to MEC 814-1 instead of to a core network via CU 1005. MEC 814-1 may process the traffic, perform one or more computations based on the received traffic, and may provide traffic to UE 105 via RU 1001-1. As discussed above, MEC 814 may include, and/or may implement, some or all of the functionality described above with respect to UPF 905, AF 830, and/or one or more other devices, systems, VNFs, CNFs, etc. In this manner, ultra-low latency services may be provided to UE 105, as traffic does not need to traverse DU 1003, CU 1005, links between DU 1003 and CU 1005, and an intervening backhaul network between RAN environment 1000 and the core network.

Figure 11:
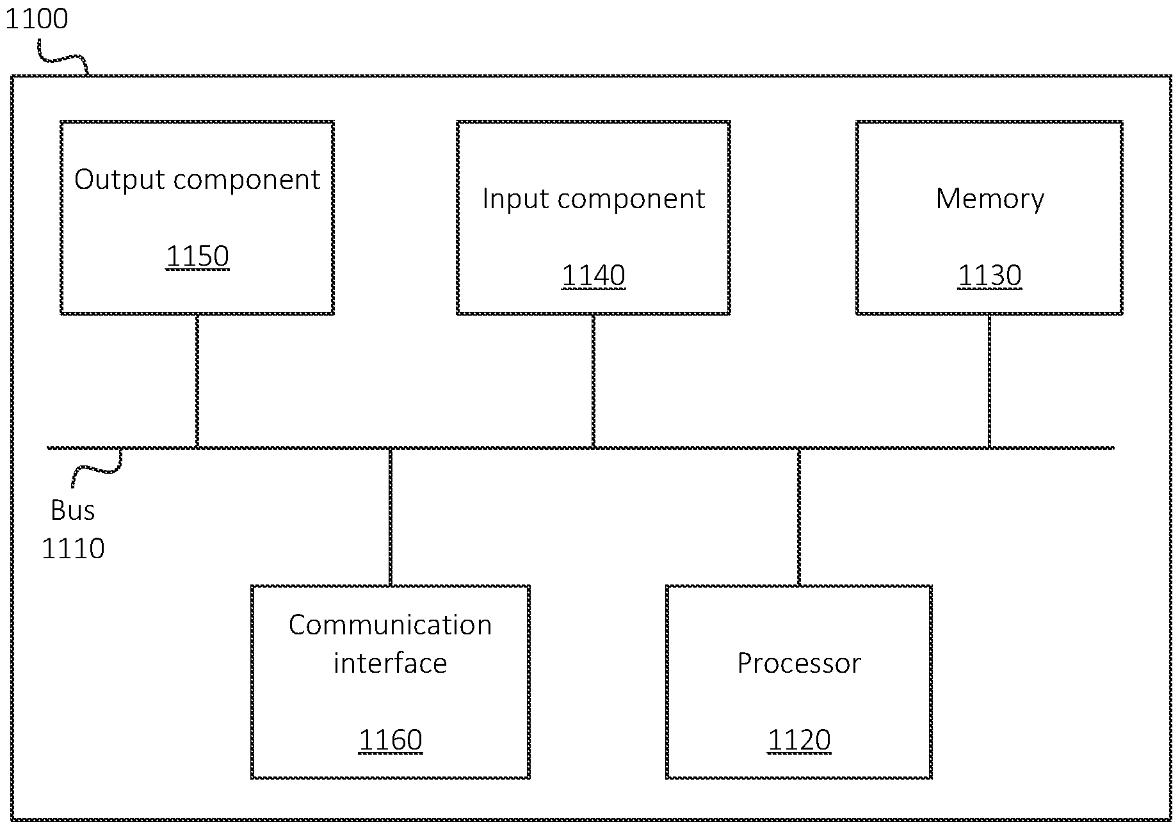
FIG. 11 illustrates example components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, a set of provisioned hardware resources of a cloud computing system, or other suitable type of hardware that interprets and/or executes instructions (e.g., processor-executable instructions). In some embodiments, processor 1120 may be or may include one or more hardware processors. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100 and/or otherwise receives or detects input from a source external to input component 1140, such as a touchpad, a touchscreen, a keyboard, a keypad, a button, a switch, a microphone or other audio input component, etc. In some embodiments, input component 1140 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems (e.g., with RAN 810, RAN 812, DN 850, etc.). For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 1100 may include more than one communication interface 1160. For instance, device 1100 may include an optical interface, a wireless interface, an Ethernet interface, and/or one or more other interfaces.

Device 1100 may perform certain operations relating to one or more processes described above. Device 1100 may perform these operations in response to processor 1120 executing instructions, such as software instructions, processor-executable instructions, etc. stored in a computer-readable medium, such as memory 1130. A computer-readable medium may be defined as a non-transitory memory device. A memory device may include space within a single physical memory device or spread across multiple physical memory devices. The instructions may be read into memory 1130 from another computer-readable medium or from another device. The instructions stored in memory 1130 may be processor-executable instructions that cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:

one or more processors configured to:

maintain User Equipment ("UE") context information associated with one or more communication sessions between a particular UE and a wireless network;

detect that the context information associated with the one or more communication sessions has been maintained by the device for at least a threshold duration of time;

output, based on detecting that the context information has been maintained by the device for at least the threshold duration of time, a status update request, wherein the status update request includes at least one of:

an identifier of the particular UE, or an identifier of the one or more communication sessions between the particular UE and the wireless network;

receive a response to the status update request, wherein the response indicates that at least one communication session, of the one or more communication sessions, is no longer active; and selectively remove, based on the response indicating that the at least one communication session is no longer active, at least a portion of the maintained UE context information associated with the one or more communication sessions between the particular UE and the wireless network.

2. The device of claim 1, wherein outputting the status update request is further based on detecting that a particular communication session, of the one or more communication sessions between the particular UE and the wireless network, has been established for at least the threshold duration of time.

3. The device of claim 2, wherein the one or more processors are further configured to:

receive a notification that the particular communication session has been established between the particular UE and the wireless network; and initiate a timer based on receiving the notification, wherein detecting that the particular communication session has been established for at least the threshold duration of time is based on the timer.

4. The device of claim 1, wherein outputting the status update request includes outputting the status update request to a session management element of the wireless network, and wherein receiving the response includes receiving the response from the session management element of the wireless network.

5. The device of claim 4, wherein the session management element of the wireless network includes a Session Management Function ("SMF").

6. The device of claim 1, wherein the status update request further includes a callback Uniform Resource Identifier ("URI") that is associated with a status update service.

7. The device of claim 1, wherein the one or more processors are further configured to:

identify, based on the response, that a particular communication session, of the one or more communication sessions, is no longer active, wherein selectively removing at least the portion of the maintained UE context information includes removing context information associated with the particular communication session.

8. A non-transitory computer-readable medium, storing a plurality of processor-executable instructions to:

maintain User Equipment ("UE") context information associated with one or more communication sessions between a particular UE and a wireless network;

detect that the context information associated with the one or more communication sessions has been maintained for at least a threshold duration of time;

output, based on detecting that the context information has been maintained for at least the threshold duration of time, a status update request, wherein the status update request includes at least one of:

an identifier of the particular UE, or an identifier of the one or more communication sessions between the particular UE and the wireless network;

receive a response to the status update request, wherein the response indicates that at least one communication session, of the one or more communication sessions, is no longer active; and selectively remove, based on the response indicating that the at least one communication session is no longer active, at least a portion of the maintained UE context information associated with the one or more communication sessions between the particular UE and the wireless network.

9. The non-transitory computer-readable medium of claim 8, wherein outputting the status update request is further based on detecting that a particular communication session, of the one or more communication sessions between the particular UE and the wireless network, has been established for at least the threshold duration of time.

10. The non-transitory computer-readable medium of claim 9, wherein the plurality of processor-executable instructions further include processor-executable instructions to:

receive a notification that the particular communication session has been established between the particular UE and the wireless network; and initiate a timer based on receiving the notification, wherein detecting that the particular communication session has been established for at least the threshold duration of time is based on the timer.

11. The non-transitory computer-readable medium of claim 8, wherein outputting the status update request includes outputting the status update request to a session management element of the wireless network, and wherein receiving the response includes receiving the response from the session management element of the wireless network.

12. The non-transitory computer-readable medium of claim 11, wherein the session management element of the wireless network includes a Session Management Function (“SMF”).

13. The non-transitory computer-readable medium of claim 8, wherein the status update request further includes a callback Uniform Resource Identifier (“URI”) that is associated with a status update service.

14. The non-transitory computer-readable medium of claim 8, wherein the plurality of processor-executable instructions further include processor-executable instructions to:

identify, based on the response, that a particular communication session, of the one or more communication sessions, is no longer active, wherein selectively removing at least the portion of the maintained UE context information includes removing context information associated with the particular communication session.

15. A method, comprising:

maintaining, by a device, User Equipment (“UE”) context information associated with one or more communication sessions between a particular UE and a wireless network;

detecting that the context information associated with the one or more communication sessions has been maintained by the device for at least a threshold duration of time;

outputting, based on detecting that the context information has been maintained by the device for at least the threshold duration of time, a status update request, wherein the status update request includes at least one of:

an identifier of the particular UE, or an identifier of the one or more communication sessions between the particular UE and the wireless network;

receiving a response to the status update request, wherein the response indicates that at least one communication session, of the one or more communication sessions, is no longer active; and selectively removing, based on the response indicating that the at least one communication session is no longer active, at least a portion of the maintained UE context information associated with the one or more communication sessions between the particular UE and the wireless network.

16. The method of claim 15, wherein outputting the status update request is further based on detecting that a particular communication session, of the one or more communication sessions between the particular UE and the wireless network, has been established for at least the threshold duration of time.

17. The method of claim 16, further comprising:

receiving a notification that the particular communication session has been established between the particular UE and the wireless network; and initiating a timer based on receiving the notification, wherein detecting that the particular communication session has been established for at least the threshold duration of time is based on the timer.

18. The method of claim 15, wherein outputting the status update request includes outputting the status update request to a Session Management Function (“SMF”) of the wireless network, and wherein receiving the response includes receiving the response from the SMF of the wireless network.

19. The method of claim 15, wherein the status update request further includes a callback Uniform Resource Identifier (“URI”) that is associated with a status update service.

20. The method of claim 15, further comprising:

identifying, based on the response, that a particular communication session, of the one or more communication sessions, is no longer active, wherein selectively removing at least the portion of the maintained UE context information includes removing context information associated with the particular communication session.

* * * * *